United States Patent
Moritoki et al.

(10) Patent No.: US 8,949,537 B2
(45) Date of Patent: Feb. 3, 2015

(54) STORAGE CONTROL APPARATUS AND METHOD FOR DETECTING WRITE COMPLETION OF DATA

(71) Applicant: Hitachi, Ltd., Tokyo (JP)

(72) Inventors: Naoki Moritoki, Tokyo (JP); Shohei Asakawa, Tokyo (JP); Takeshi Yamauchi, Tokyo (JP); Suguru Shimotaya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/241,841

(22) PCT Filed: Feb. 25, 2013

(86) PCT No.: PCT/JP2013/054772
§ 371 (c)(1),
(2) Date: Feb. 27, 2014

(87) PCT Pub. No.: WO2014/128967
PCT Pub. Date: Aug. 28, 2014

(65) Prior Publication Data
US 2014/0344521 A1   Nov. 20, 2014

(51) Int. Cl.
*G06F 12/02* (2006.01)
*G06F 12/08* (2006.01)

(52) U.S. Cl.
CPC .................. *G06F 12/0813* (2013.01)
USPC ........... 711/120; 711/154; 711/156; 711/221; 718/100; 718/102

(58) Field of Classification Search
USPC ........... 711/120, 154, 156, 221; 718/100, 102
See application file for complete search history.

(56) References Cited

U.S. PATENT DOCUMENTS

| | | | | |
|---|---|---|---|---|
| 5,265,235 A | * | 11/1993 | Sindhu et al. | 711/120 |
| 5,555,262 A | * | 9/1996 | Urbansky | 370/505 |
| 5,809,527 A | * | 9/1998 | Cooper et al. | 711/133 |
| 6,148,378 A | * | 11/2000 | Bordaz et al. | 711/147 |
| 6,263,409 B1 | * | 7/2001 | Haupt et al. | 711/154 |
| 6,480,942 B1 | * | 11/2002 | Hirairi | 711/156 |
| 6,606,715 B1 | | 8/2003 | Kikuchi | |
| 7,287,111 B2 | * | 10/2007 | Hur | 710/244 |
| 7,525,919 B2 | * | 4/2009 | Matsui et al. | 370/238 |
| 7,707,366 B2 | * | 4/2010 | Tagawa | 711/154 |
| 7,707,367 B1 | * | 4/2010 | Tran et al. | 711/154 |

(Continued)

FOREIGN PATENT DOCUMENTS

| | | |
|---|---|---|
| JP | 64-008433 A | 1/1989 |
| JP | 03-269744 A | 12/1991 |

(Continued)

*Primary Examiner* — Stephen Elmore
(74) *Attorney, Agent, or Firm* — Volpe and Koenig, P.C.

(57) ABSTRACT

A processor transmits, to a communication control module, at least one write request packet with which at least one data block element configuring a data block is respectively associated, and updates a first counter to a value corresponding to the number of the transmitted write request packets. The communication control module writes a data block element associated with the write request packet to a cache memory, updates a third counter to a value corresponding to the number of the transmitted data block elements, and reflects the third counter to a second counter. The processor determines that the data block is written to the cache memory when the second counter reaches the first counter after all write request packets are transmitted.

2 Claims, 10 Drawing Sheets

(56) References Cited

U.S. PATENT DOCUMENTS

| | | | |
|---|---|---|---|
| 7,870,200 B2* | 1/2011 | Slater et al. | 709/206 |
| 8,271,761 B2* | 9/2012 | Naganuma et al. | 711/173 |
| 8,412,884 B1* | 4/2013 | Ide et al. | 711/113 |
| 8,645,623 B1* | 2/2014 | O'Shea et al. | 711/114 |
| RE45,097 E* | 8/2014 | Iyer et al. | 711/117 |
| 2003/0079093 A1* | 4/2003 | Fujii et al. | 711/147 |
| 2005/0262235 A1* | 11/2005 | Childress et al. | 709/224 |
| 2010/0262738 A1 | 10/2010 | Swing et al. | |
| 2011/0153884 A1 | 6/2011 | Shimotaya et al. | |
| 2014/0173217 A1* | 6/2014 | Kalamatianos et al. | 711/137 |

FOREIGN PATENT DOCUMENTS

| | | |
|---|---|---|
| JP | 2001-034427 A | 2/2001 |
| JP | 2011-523109 A | 8/2011 |
| JP | 2012-523619 A | 10/2012 |

* cited by examiner

STORAGE CONTROL APPARATUS AND METHOD FOR DETECTING WRITE COMPLETION OF DATA

TECHNICAL FIELD

The present invention relates to technology of a storage control apparatus and of a method for detecting a write completion of data.

BACKGROUND ART

A storage system provided with a function for detecting a write completion is known for instance. The storage system is provided with a plurality of storage apparatuses and a control module coupled with the plurality of storage apparatuses. The control module is provided with at least one processor module that transmits a write packet, at least one storage resource, and at least one transfer control module coupled with the processor module and the storage resource. The transfer control module is provided with a receiver and a transmitter. The receiver receives a write packet from the processor module, and transmits a write packet provided with the following (1-A) to (1-D) on the basis of the write packet received from the processor, (1-A) a write code that is a code representing a write;
(1-B) a specific code;
(1-C) write target data; and
(1-D) destination information indicating a storage resource of a write destination.

When the transmitter receives a write packet and the received write packet includes the specific code, the transmitter writes the write target data in the received write packet to the storage resource indicated by the destination information in the packet, creates a response packet that is a packet corresponding to a response indicating a completion of a write, and transmits the created response packet (for instance, PTL 1).

CITATION LIST

Patent Literature

[PTL 1]
Published Japanese Translation of PCT Application No. 2011-523109

SUMMARY OF INVENTION

Technical Problem

As described above, a storage system composed of a controller module and a plurality of storage devices is known. The controller module comprises a processor module, a cache memory, and a transfer control module coupled with the processor module and the cache memory for instance. The processor module temporarily writes the write target data to the cache memory, and then writes the write target data from the cache memory to a storage device for instance.

As a method for detecting that a write of a write target data to the cache memory has been completed, a method described in the following may be conceivable for instance. More specifically, the processor module transmits a write packet that contains a write target data and that is directed to the cache memory, then transmits a read packet that is directed to the cache memory, and then obtains the write target data from the cache memory as a response of the read packet, thereby detecting that the write target data has been written to the cache memory.

However, a processing speed of the storage system may be reduced when the above method is adopted. This is because the processor module transmits a read packet and then waits for a response of the read packet, and any other processing operations are not carried out during the time period.

An object of the present invention is to lessen reduction of a processing speed caused by detecting a write completion of data. Another object of the present invention is to increase reliability of detection of a write completion of data.

Solution to Problem

The storage control apparatus in accordance with one embodiment is provided with a processor, a first and a second counters used by the processor, a cache memory, a communication control module that is coupled with the processor and the cache memory and that controls communication with the processor and controls communication with the cache memory, and a third counter used by the communication control module.

The processor transmits, to a communication control module, at least one write request packet with which at least one data block element configuring a write target data block is respectively associated, updates the first counter to a value corresponding to the number of transmitted write request packets, and after transmitting all write request packets when the second counter reaches the first counter, it is determined that a data block is written in the cache memory.

The communication control module receives a write request packet, transmits a data block element associated with the received write request packet to write the data block element to the cache memory, updates a third counter to a value corresponding to the number of the transmitted data block elements, and reflects the third counter to the second counter. The storage control apparatus may be a storage system or a computer.

Advantageous Effects of Invention

According to the present invention, it is possible to lessen reduction of a processing speed by detecting a write completion of data. Furthermore, according to the present invention, it is possible to increase reliability of detection of a write completion of data.

DESCRIPTION OF EMBODIMENTS

Figure 10:
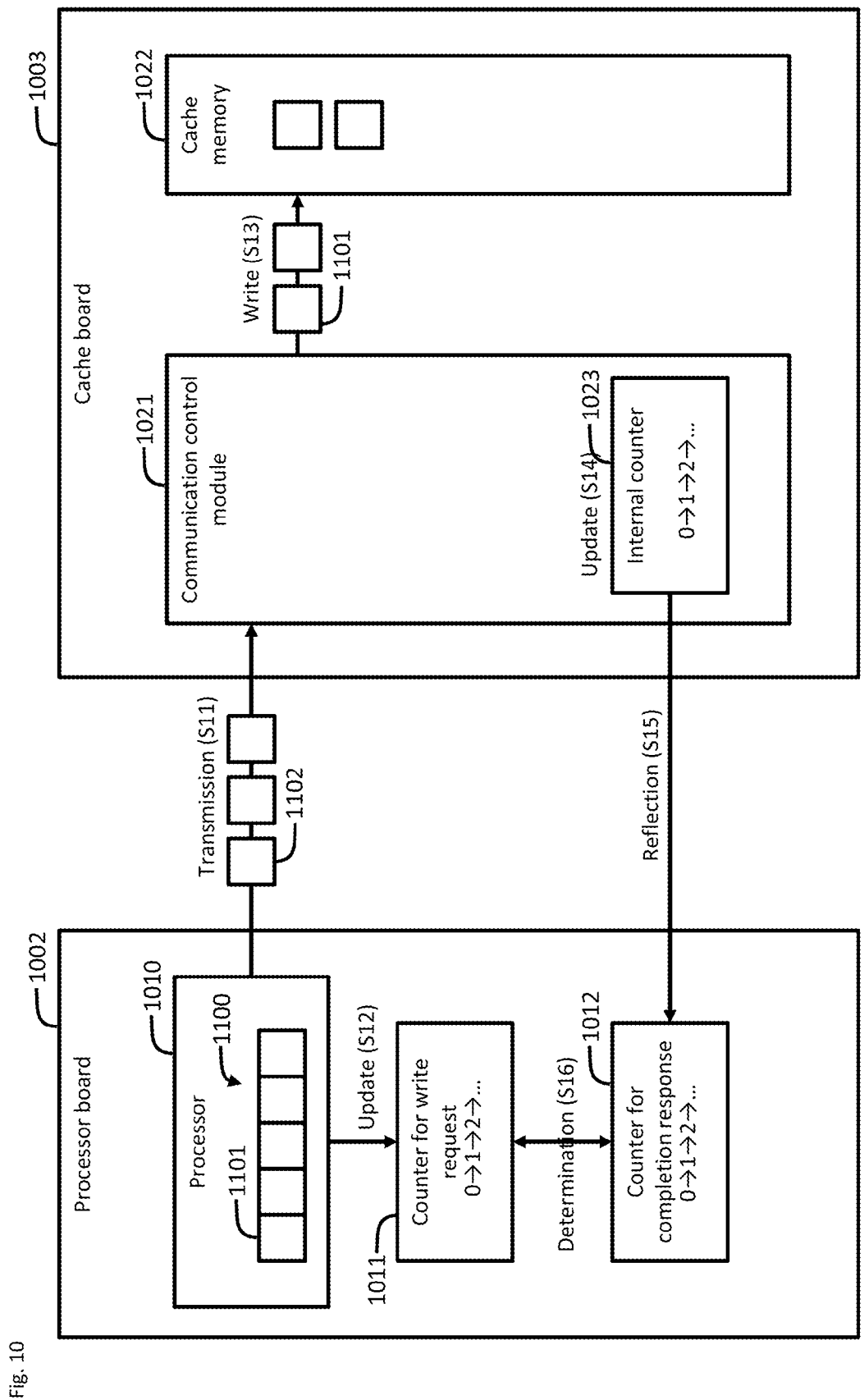
FIG. 10 is a view showing an example of a configuration of a storage control apparatus.

A storage control apparatus in accordance with one example is provided with a processor board 1002 and a cache board 1003 as shown in FIG. 10 for instance. The storage control apparatus may be a storage system or a computer. The processor board 1002 is provided with a processor 1010, counter 1011 for a write request, and a counter 1012 for a completion response. The cache board 1003 is provided with a communication control module 1021 and a cache memory 1022. The communication control module 1021 return a response not necessarily after a write is completed for a write request (in other words, the communication control module 1021 is a posted type). The communication control module 1021 is provided with an internal counter 1023.

The processor 1010 divides a write target data block 1100 into at least one data block element 1101, includes each data block element 1101 in a write request packet 1102, and transmits it to the cache board 1003 (S11). The processor 1010 updates the counter 1011 for a write request according to the number of transmitted write request packets 1102 (S12). The communication control module 1021 writes the data block element 1101 associated with the write request packet 1102 to the cache memory 1022 (S13) and updates the internal counter 1023 according to the number of written data block elements 1101 (S14). The communication control module 1021 reflects the internal counter 1023 to the completion response counter 1012 (S15). The processor 1010, after transmitting all write request packets 1102, when the counter 1012 for a completion response reaches the counter 1011 for a write request (S16), it is determined that a data block 1100 is written to the cache memory 1022. Some examples will be explained below with reference to the drawings.

Example 1

Figure 1:
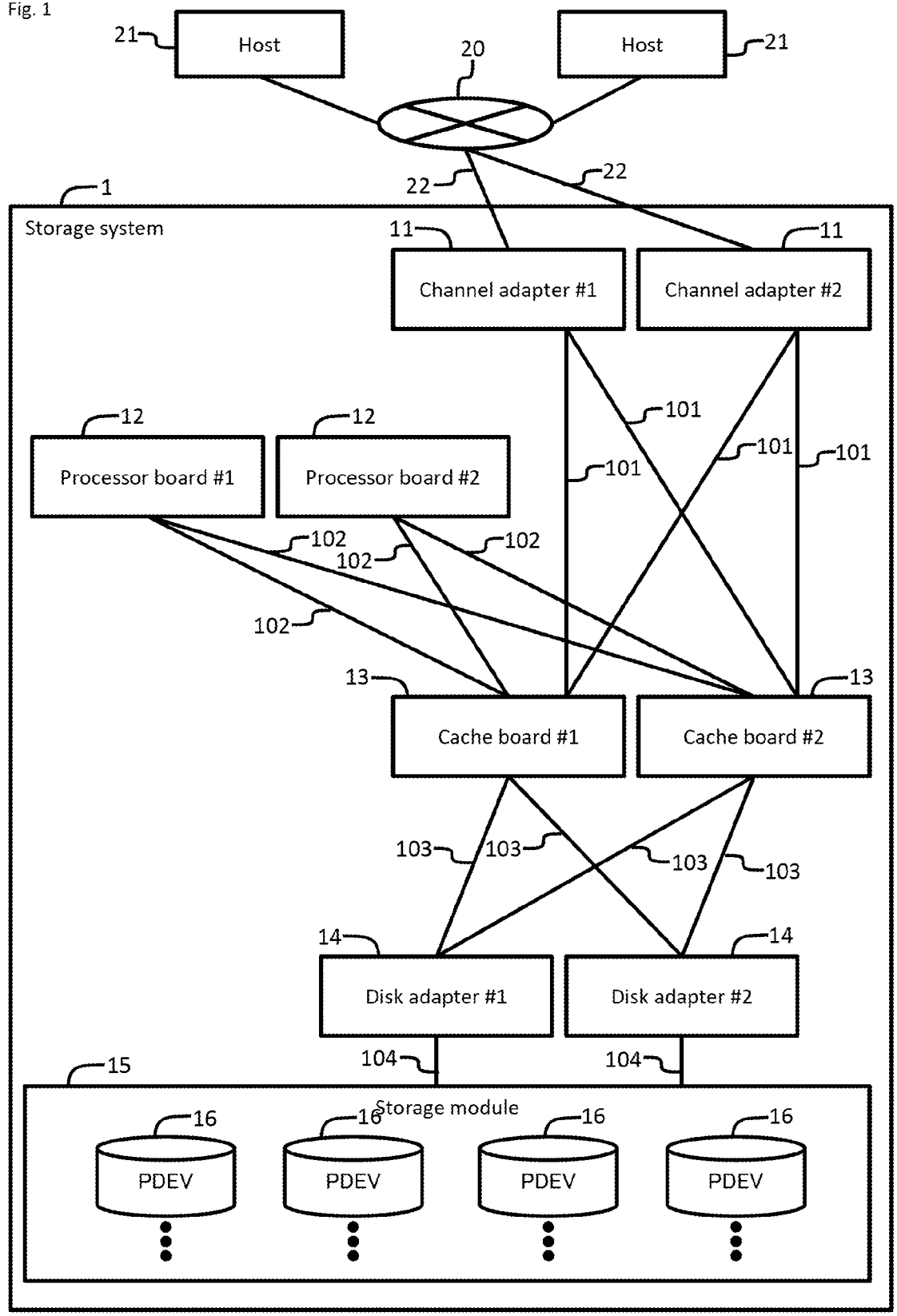
FIG. 1 is a view showing an example of a configuration of a storage system in accordance with Example 1.

FIG. 1 is a view showing an example of a configuration of a storage system in accordance with Example 1.

A storage system 1 is provided with at least one channel adapter 11 (for instance #1 and #2), at least one cache board 13 (for instance #1 and #2), at least one processor board 12 (for instance #1 and #2), at least one disk adapter 14 (for instance #1 and #2), and a storage module 15. "#1" and "#2" are given for descriptive purposes for identifying devices in the present description, and are omitted when there is no particular need to identify devices.

The channel adapter 11 lies between a communication path 22 coupled with a communication network 20 and an internal bus 101 coupled with the cache board 13. The channel adapter 11 converts data that are transmitted or received between the communication path 22 and the internal bus 101. For instance, when the communication network 20 is a SAN (Storage Area Network) and the internal bus 101 conforms to a PCI-Express (PCIe), the channel adapter 11 is provided with a SAN-compatible I/F (Interface) (for instance, a Fibre Channel I/F) on the communication network 20 side, and a PCIe-compatible I/F on the internal bus 101 side.

The disk adapter 14 lies between an internal bus 103 coupled with the cache board 13 and a communication path 104 coupled with the storage module 15. The disk adapter 14 converts data that are transmitted or received between the internal bus 103 and the communication path 104. For instance, when the internal bus 103 conforms to the PCIe and the communication path 104 conforms to the SAN, the disk adapter 14 is provided with a PCIe-compatible I/F on the internal bus 103 side and a SAN-compatible I/F on the communication path 104 side.

The storage module 15 stores data. The storage module 15, for instance, includes a plurality of physical storage devices (hereinafter, PDEV) 16. The plurality of PDEVs 16 is coupled with at least one of the disk adapters 14 in such a manner that the PDEVs 16 are capable of communicating with the disk adapters 14. A plurality of PDEVs is, for instance, a plurality of HDDs (Hard Disk Drives) and/or a plurality of flash memories. The storage module 15 may configure a RAID (Redundant Arrays of Inexpensive Disks).

The processor board 12 controls the storage system 1. Each of the processor boards 12 #1 and #2 is coupled with the cache board 13 #1 and #2 via an internal bus 102. The internal bus 102 conforms to the PCIe for instance. Details of the processor board 12 will be described later.

The cache board 13 temporarily caches data. The storage system 1 temporarily stores data in the cache board 13 when a data write request is received from the host 21, and then stores the data from the cache board 13 in the storage module 15. The storage system reads data from the cache board 13 and returns it to the host 21, when a data read request is received from the host 21 and the data exists in the cache board 13.

The processor board 12, when certain processing is handed over to another processor board 12, temporarily stores control information in accordance with the processing in the cache board 13. Another processor board 12 reads the control information associated with the processing from the cache board 13 and takes over the processing. Details of the cache board 13 will be described later.

Figure 2:
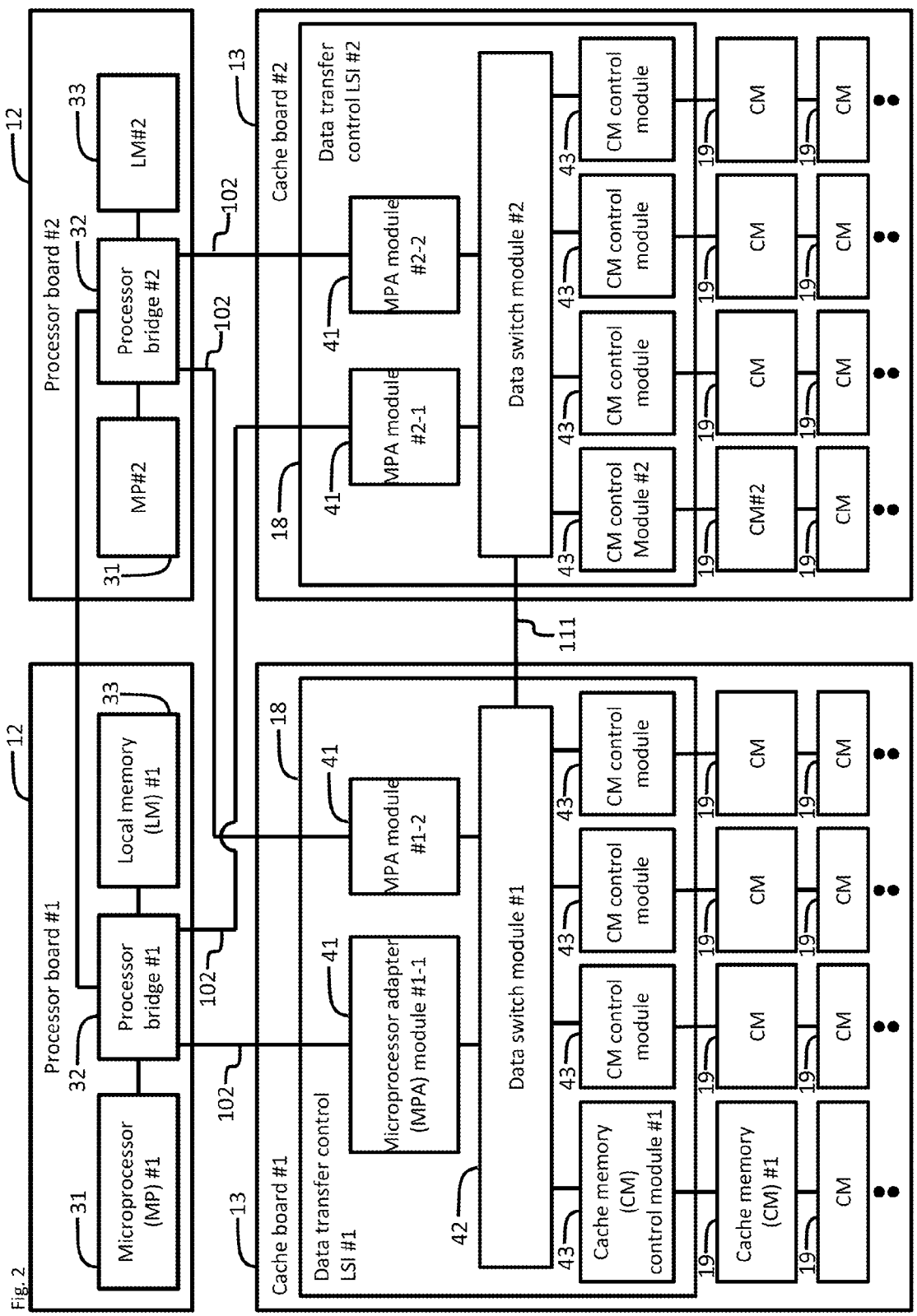
FIG. 2 is a view showing an example of a configuration of a processor board and a cache board.

FIG. 2 is a view showing an example of a configuration of the processor board 12 and the cache board 13.

The processor board 12 is provided with a microprocessor (hereinafter referred to as an "MP") 31, a processor bridge 32, and a local memory (hereinafter referred to as an "LM") 33. The processor board 12 may be provided with a plurality of MPs 31 and/or the LMs 33.

The LM 33 is capable of temporarily storing data. The LM33 is composed of a semiconductor integrated circuit for instance. The LM 33 conforms to a standard of DDR3 SDRAM (Double-Data-Rate3 Synchronous Dynamic Random Access Memory) that is a kind of DRAM for instance. Typically, a speed in which the MP 31 writes or reads data to or from the LM 33 is faster than a speed in which the MP 31 writes or reads data to or from the CM 19.

The MP 31 executes a variety of arithmetic processing operations. The MP 31 may be composed as an arithmetic circuit that materializes predetermined processing, may be composed as a versatile arithmetic circuit capable of processing a variety of programs, or may be composed as a combination thereof. The MP 31 writes data to the LM 33 or reads data from the LM 33 via the processor bridge 32 for instance. The MP 31 requests a data write to the cache board 13, or requests a data read from the cache board 13 via the internal bus 102 for instance.

An MP 31 of a certain processor board 12 is capable of handing over processing to an MP 31 of other processor board 12. For instance, in FIG. 2, an MP 31 #1 of a processor board 12 #1 is capable of handing over processing to an MP 31 #2 of a processor board 12 #2. An MP 31 of a certain processor board 12 may be capable of accessing an LM 33 of other processor board 12. For instance, in FIG. 2, the MP 31 #2 of the processor board 12 #2 may be capable of accessing an LM 33 #1 of the processor board 12 #1.

The cache board 13 is provided with a data transfer control LSI 18 and a cache memory (hereinafter referred to as a "CM") 19.

The CM 19 temporarily stores (caches) data. The CM 19 is composed of a semiconductor integrated circuit for instance. The CM 19 may be composed as a DRAM (Dynamic Random Access Memory) or may be composed as a flash memory.

The data transfer control LSI 18 is provided with a microprocessor adapter module (hereinafter referred to as an "MPA module") 41, a data switch module 42, and a cache memory control module (hereinafter referred to as a "CM control module") 43. One processor board 12 is coupled with one MPA module 41 via the internal bus 102. A data transfer control LSI 18 may be provided with a plurality of MPA modules 41. A data transfer control LSI 18 may be provided with a plurality of CM control modules 43. Each CM control module 43 may be coupled with a plurality of CMs 19.

An MPA module 41 plays such a role as so called a gateway when a processor board 12 accesses a CM 19 of a cache board 13. An MPA module 41 receives a data write request or a read request or the like from an MP 31 of a processor board 12 coupled with the MPA module 41 for instance. An MPA module 41 then, on the basis of the request, requests a data write or a data read to a CM control modules 43 via a data switch module 42 for instance. An MPA module 41 also writes data to an LM 33 of a processor board 12 coupled with the MPA module 41, or reads data from the LM 33 for instance.

The above-mentioned write request and the read request may be transmitted or received on a packet data provided with a predetermined header and a payload. In other words, an MP 31 may divide large sized data into predetermined sized packet data and transmit it to an MPA module 41. A header of a packet data may include a destination of the packet data. A destination may be information for specifying a CM 19 that is a target of a write request or a read request included in the packet data.

A data switch module 42 switches a transfer destination of a packet data on the basis of a destination included in the packet data. A data switch module 42 may receive a packet data from an MPA module 41 and transfer the packet data to a CM control module 43 that controls a CM 19 specified by a destination included in the packet data for instance. The data switch module 42 may receive a packet data from the CM control module 43 and transfer the packet data to an MPA module 41 specified by a destination included in the packet data.

A data switch module 42 #1 of the cache board 13 #1 and a data switch module 42 #2 of the cache board 13 #2 may be coupled by an internal bus 111. For instance, in FIG. 2, a packet data transmitted by the MP 31 #1 may be transferred from the data switch module 42 #1 to the data switch module 42 #2, and then transferred to a CM control module 43 #2.

The CM control module 43 controls a data write and a data read or the like to and from at least one CM 19 coupled therewith. The CM control module 43 may write data to an area indicated by address information of a destination CM 19 and read data from an area indicated by the address information on the basis of address information included in a write request or a read request for instance.

The above-described plurality of elements in the processor board 12 and the cache board 13 such as the MPA module 41 and the CM control module 43 may be composed of a hardware circuit.

The MP 31 in accordance with the present example is provided with the following functions. Details of the functions will be described later.

A1) A function of transmitting, to the MPA module 41, at least one write request packet with which at least one data block element configuring a write target data block is associated, and updating a first counter to a value corresponding to the number of transmitted write request packets.

A2) A function of determining that a data block is written to the cache memory when a second counter reaches the first counter after all write request packets are transmitted.

The MPA module 41 in accordance with the present example is provided with the following functions. Details of the functions will be described later.

B1) A function of receiving a write request packet from the MP 31.

B2) A function of transmitting a data block element associated with a received write request packet to the CM control module 43 for writing it to the cache memory 19.

B3) A function of updating a third counter to a value corresponding to the number of transmitted data block elements.

B4) A function of reflecting the third counter to the second counter.

The cache memory control module 43 in accordance with the present example is provided with the following functions.

C1) A function of writing a data block element included in a write request packet to the cache memory 19 and transmitting a completion response packet to the MPA module 41 when the write request packet is receive from the MPA module 41.

Figure 3:
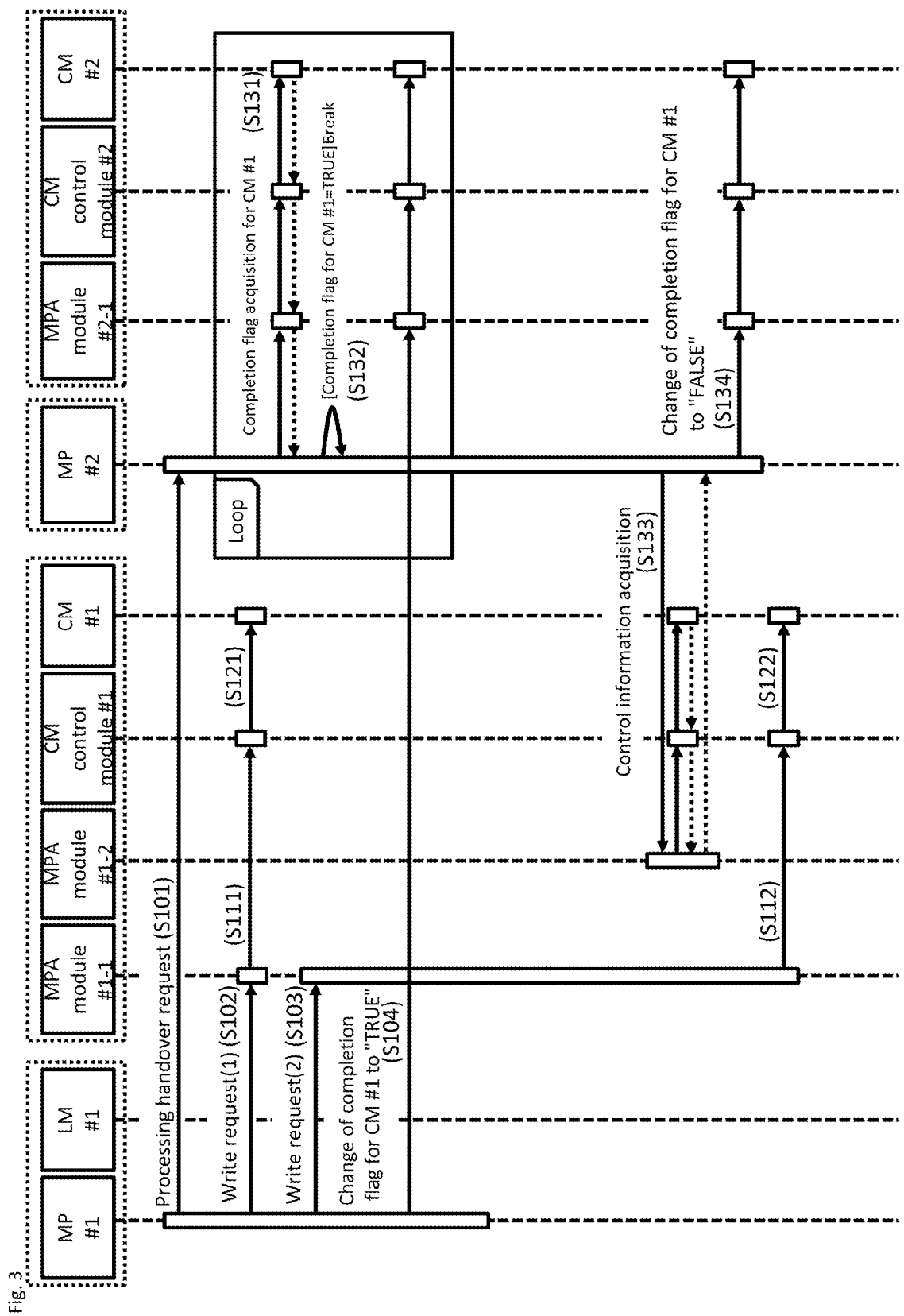
FIG. 3 is a view showing an example of a sequence chart of a storage system when processing of a microprocessor #1 is handed over to a microprocessor #2 in accordance with the prior art.

FIG. 3 is a view showing a sequence chart of a storage system when processing of the MP 31 #1 is handed over to the MP 31 #2 in accordance with prior art. Here, the technical problems of conventional storage systems are explained.

<Processing of the MP 31 #1>

The MP 31 #1 transmits a processing handover request to the MP 31 #2 that is a handover destination (S101).

The MP 31 #1 divides the control information into at least two control information blocks and transmits one control information block on one write request packet data to an MPA module 41 #1-1 for instance (S102). The control information block is transferred to a CM control module 43 #1 via the MPA module 41 #1-1 (S111) and written to a CM 19 #1 by the CM control module 43 #1 (S121). The MP 31 #1 repeats processing similar to the step S102 until all information control block transmissions are completed (S103).

The MP 31 #1 changes a completion flag for the CM 19 #1 in a predetermined area of a CM 19 #2 (S104) to "TRUE". The completion flag for the CM 19 #1 shows a write to the CM 19 #1 is completed in the case of "TRUE", and shows a write to the CM 19 #1 is uncompleted in the case of "FALSE" for instance.

<Processing of the MP 31 #2>

The MP 31 #2 obtains the completion flag for the CM 19 #1 from a predetermined area of the CM 19 #2 (S131) when a transmitted processing handover request transmitted from the MP 31 #1 is received in the step S101, and determine whether or not the completion flag for the CM 19 #1 is "TRUE" (S132). The MP 31 #2 repeats S131 to S132 until the completion flag for the CM 19 #1 turns "TRUE" In other words, the MP 31 #2 executes polling to the predetermined area provided with the completion flag for the CM 19 #1 of the CM 19 #2.

The MP 31 #2 leaves the repetitive processing of the steps S131 to S132 and obtains control information written by the MP 31 #1 from a predetermined area of the CM 19 #1 (S133) when the completion flag for the CM 19 #1 is "TRUE". The MP 31 #2 may access to the CM 19 #1 via an MPA module 41 #1-2 for instance. Then, the MP 31 #2 changes the completion flag for the CM 19 #1 in the predetermined area of the CM 19 #2 to "FALSE" (S134).

<When a Write of the Control Information Block is Delayed>

For instance, even when a write request of a first control information block in the step S102 is immediately written to the CM 19 #1 (S111 and S121), suppose a write request of a second control information block in the step S103 is written to the CM 19 #1 after a while caused by a delay occurred in the MPA module 41 #1-1 (S112 and S122).

Write processing to the CM 19 #1 of the control information block in the steps S111 (S112) to S121 (S122) is execute by "Posted" accompanied by no write completion response. Accordingly, the MP 31 #1 cannot know in which timing the write processing to the CM 19 #1 of the control information block is completed. Therefore, the MP 31 #1 changes the completion flag for the CM 19 #1 to "TRUE" (S104) in a timing in which a write request of the last control information block is transmitted (for instance, after a completion of the step S103). However, a state may be occurred at this timing in which the last control information block is not written to the CM 19 #1.

For instance, as shown in FIG. 3, when a second control information block is written to the CM 19 #1 (S122) after the MP 31 #2 obtains control information from the CM 19 #1 (S133), the MP 31 #2 may possibly obtain an old (before update) control information block instead of the second control information block in the step S122. The storage system in accordance with Example 1 prevents an occurrence of such a situation. The storage system in accordance with Example 1 is further explained below.

Figure 4:
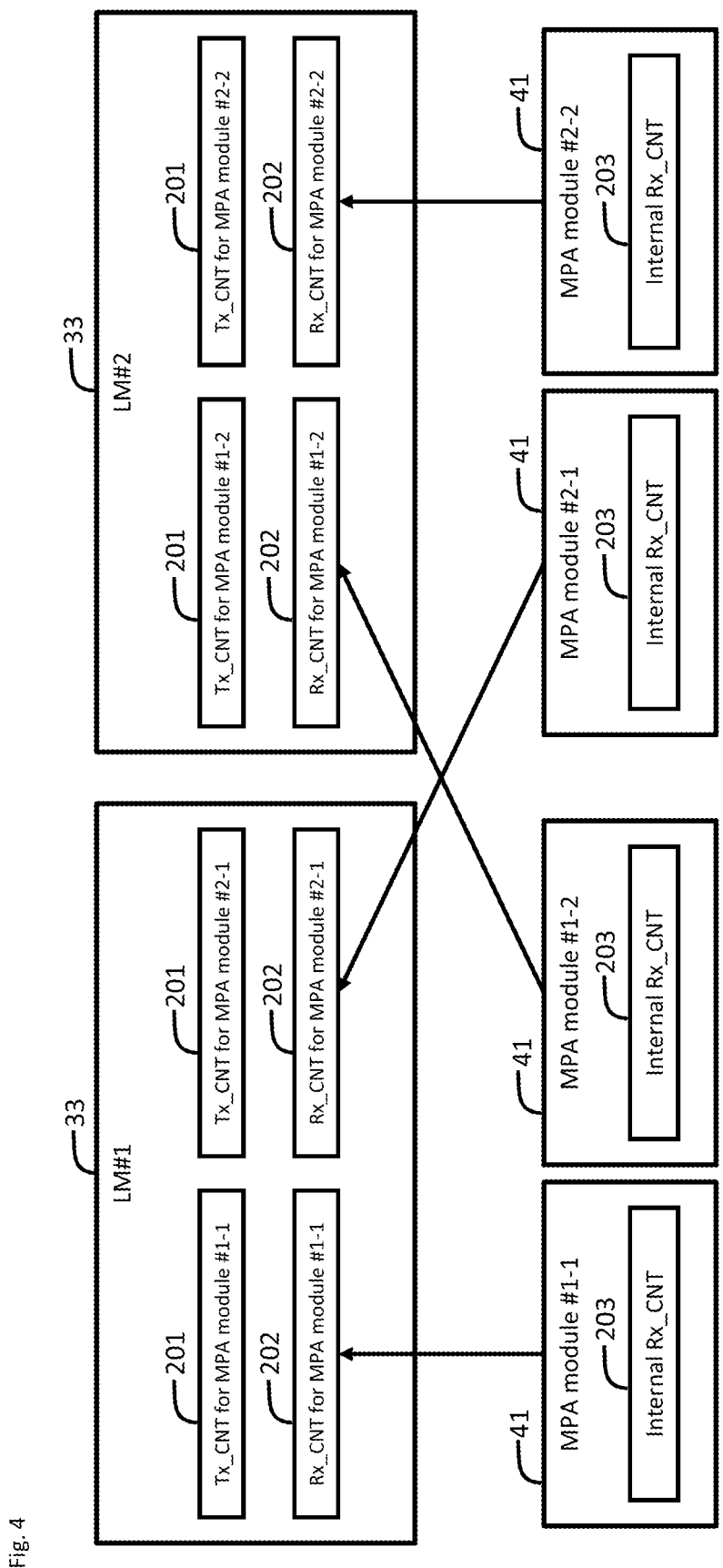
FIG. 4 is a view for explaining counters provided in each local memory and a counter provided in each microprocessor adapter module in accordance with Example 1.

FIG. 4 is a view for explaining counters provided in each LM33 and each MPA module 41 in accordance with Example 1. Example 1 solves the problem explained in FIG. 3 above by each LM 33 and each MPA module 41 provided with predetermined counters.

An LM 33 of a processor board 12 is provided with counters 201 for a write request of a packet data corresponding to each MPA module 41 coupled with the processor board 12 in which the LM33 is provided, and counters 202 for a completion response. Hereinafter, the counter 201 for a write request may be referred to as a "Tx_CNT" and the counter 202 for a completion response may be referred to as an "Rx_CNT".

For instance, since the processor board 12 #1 shown in FIG. 2 is coupled with the MPA module 41 #1-1 and MPA module 41 #2-1, the LM 33 #1 is provided with the Tx_CNT and the Rx_CNT for the MPA module 41 #1-1 and the Tx_CNT and the Rx_CNT for the MPA module 41 #2-1 as shown in FIG. 4.

Similarly, the processor board 12 #2 shown in FIG. 2 is coupled with the MPA module 41 #1-2 and an MPA module 41 #2-2, the LM 33 #2 is provided with the Tx_CNT and the Rx_CNT for the MPA module 41 #1-2 and the Tx_CNT and the Rx_CNT for the MPA module 41 #2-2 as shown in FIG. 4.

An MPA module 41 of a cache board 13 is provided with a counter 203 for a completion response inside. Hereinafter, the internal completion response counter 203 may be referred to as an "internal Rx_CNT". An internal Rx_CNT may be assigned to a predetermined register of an MPA module 41.

For instance, an MP 31 increments a Tx_CNT corresponding to an MPA module 41 of an LM 33 each time when a control information block is transmitted to the MPA module 41. For instance, an MPA module 41 increments its internal Rx_CNT each time when a write completion acknowledgement of a control information block is received from a CM control module 43. For instance, an MPA module 41 reflects (writes) an internal Rx_CNT to an Rx_CNT corresponding to the MPA module 41 of an LM 33 at a predetermined timing. The predetermined timing may be timing when an internal Rx_CNT is updated, or a predetermined cycle, or a combination thereof. The Tx_CNT, the Rx_CNT, and the internal Rx_CNT may be updated according to a predetermined rule, in addition to when they are incremented. For instance, decrement from a predetermined value may be acceptable. The similar rule applies also in the following.

Thus, an MP 31 can determining that all control information blocks are written to a CM when a Tx_CNT and an Rx_CNT corresponding to a predetermined MPA module 41 of an LM 33 are compared and "Rx_CNT≥Tx_CNT" is true. Details of an operation of the storage system in accordance with Example 1 using the configuration described above are explained next.

Figure 5:
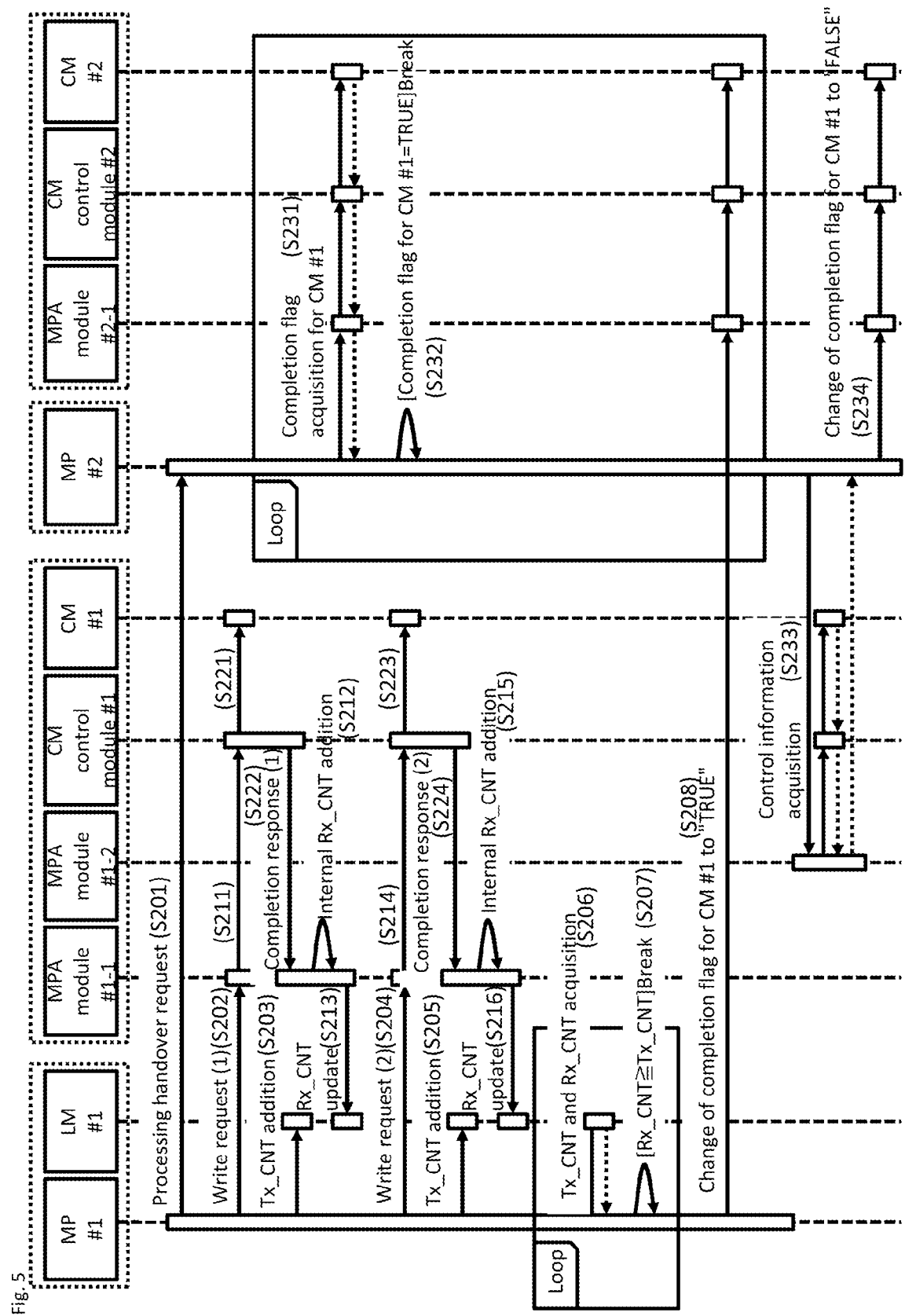
FIG. 5 is a view showing an example of a sequence chart of the storage system when processing of a microprocessor #1 is handed over to a microprocessor #2 in accordance with Example 1.

FIG. 5 is a view showing a sequence chart of the storage system when processing of the MP 31 #1 in accordance with Example 1 is handed over to the MP 31 #2.

<Processing of the MP 31 #1>

The MP 31 #1 transmits a processing handover request to the MP 31 #2 that is a handover destination (S201).

The MP 31 #1 divides control information into at least two control information blocks and transmits one control information block on a packet data of one write request to the MPA module 41 #1-1 for instance (S202). The MP 31 #1 increments the Tx_CNT for the MPA module 41 #1-1 of the LM 33 #1 (S203). The MP 31 #1 repeats processing similar to steps S202 to S203 until all transmissions of the control information blocks are completed (S204 to S205).

Then, the MP 31 #1 obtains the Rx_CNT and the Tx_CNT for the MPA module 41 #1-1 of the LM 33 #1 (S206), and determines whether or not "Rx_CNT≥Tx_CNT" is true (S207). The MP 31 #1 repeats S206 to S207 until "Rx_CNT≥Tx_CNT" turns "TRUE".

The MP 31 #1 leaves the repetitive processing of the steps S206 to S207 and changes the completion flag for the CM 19 #1 in the predetermined area of the CM 19 #2 to "TRUE" (S208), when the determination of "Rx_CNT≥Tx_CNT" in S207 is "TRUE".

<Processing of the MP 31 #2>

The MP 31 #2 obtains the completion flag for the CM 19 #1 from the predetermined area of the CM 19 #2 (S231) when a transmitted processing handover request from the MP 31 #1 is received in the step S201, and determines whether or not the completion flag for the CM 19 #1 is "TRUE" (S232). The MP 31 #2 repeats S231 to S232 until the completion flag for the CM 19 #1 turns "TRUE". In other words, the MP 31 #2 executes polling to the predetermined area of the CM 19 #2 provided with the completion flag for the CM 19 #1.

The MP 31 #2 leaves the repetitive processing of the steps S231 to S232 and obtains the control information written by the MP 31 #1 from the predetermined area of the CM 19 #1 (S233), when the determination of the completion flag for the CM 19 #1 in S232 is "TRUE". Then the MP 31 #2 changes the completion flag for the CM 19 #1 in the predetermined area of the CM 19 #2 to "FALSE" (S234).

<Processing of the Cache Board 13 #1>

The CM control module 43 #1, when a write request of a control information block is received from the MP 31 #1 via the MPA module 41 #1-1 (S211), writes the control information block to a predetermined area of the CM 19 #1 (S221) and transmits a write completion response to the MPA module 41 #1-1 (S222).

The MPA module 41 #1-1 increments the internal Rx_CNT when the write completion response is received (S212). Then, the MPA module 41 #1-1 reflects the internal Rx_CNT to the Rx_CNT for the MPA module 41 #1-1 of the LM 33 #1 (S213). The above described processing is executed similarly for a second and subsequent control information blocks (S214, S223, S224, S215, and S216).

Accordingly, even when a write of the second control information block to the CM 19 #1 is delayed as shown in FIG. 3, timing in which the internal Rx_CNT of the MPA module 41 #1-1 is reflected to the Rx_CNT for the MPA module 41 #1-1 of the LM 33 #1 is delayed by that amount. Since the determination in the step S207 of the MP 31 #1 does not turn to "Rx_CNT≥Tx_CNT" during the time period, processing of changing the completion flag for the CM 19 #1 to "TRUE" in the step S208 does not occur either. Since the MP 31 #2 does not determine that the completion flag for the CM 19 #1 is "TRUE" in the step S232 during the time period, it does not obtain the control information from the predetermined area of the CM 19 #1 either (S233).

The storage system in accordance with Example 1 is capable of preventing the MP 31 #2 from obtaining old (before update) control information from the predetermined area of the CM 19 #1 even when a write of the control information block to the CM 19 #1 is delayed.

Figure 6:
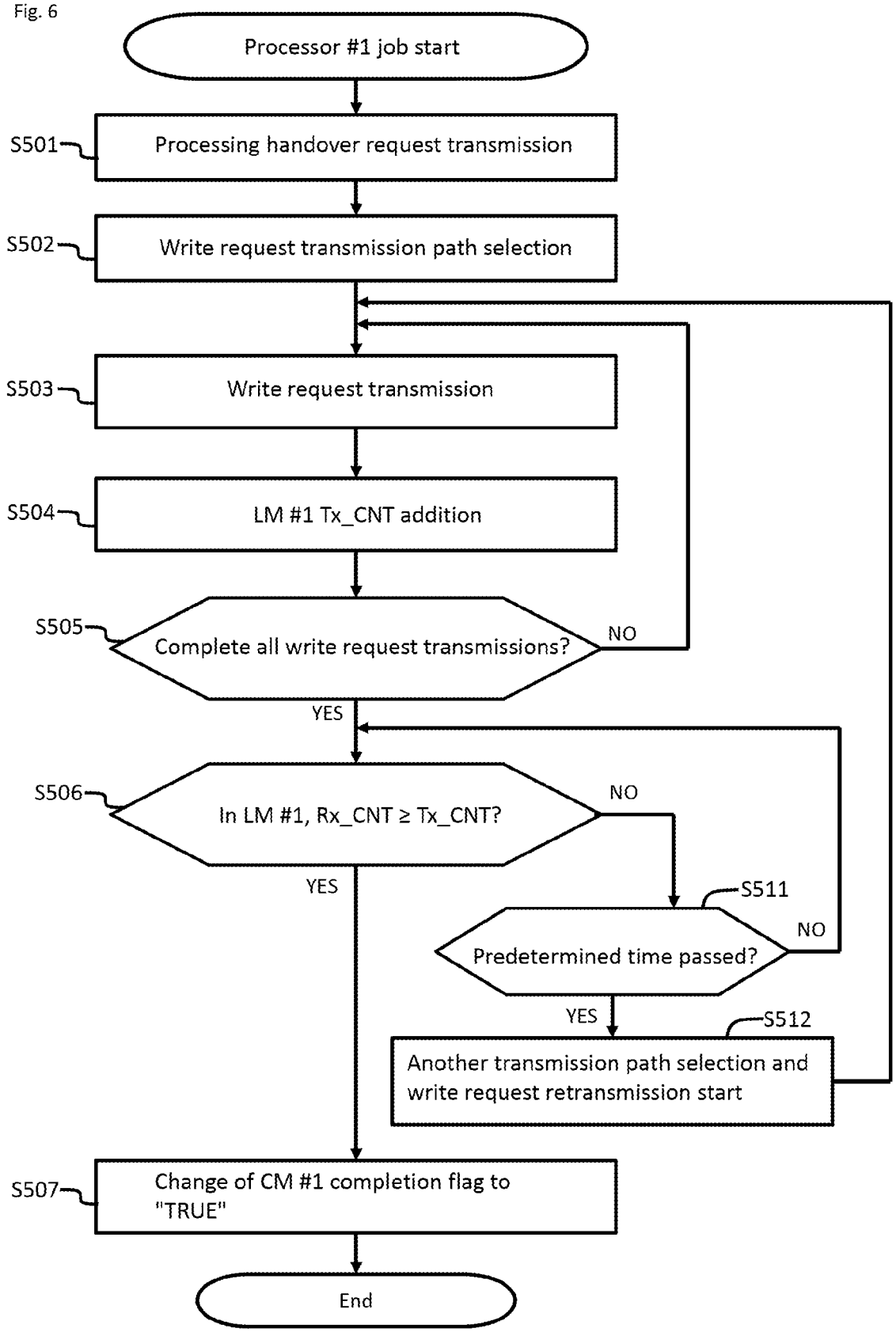
FIG. 6 is a view showing an example of a flowchart of processing of microprocessors when an occurrence of a failure is considered.

FIG. 6 shows an example of a processing flowchart of the MP 31 when considering occurrence of a failure. Referring to FIG. 5 and FIG. 6, processing is explained in which the MP 31 #1 writes a control information block to the CM 19 #1 by considering occurrence of a failure.

The MP 31 #1 selects a path for transmitting a write request of a control information block (hereinafter referred to as "transmission path") (S502) after transmitting a processing handover request (S501), for instance, before the step S211 in FIG. 5 (in other words, before starting transmission of a control information block). The MP 31 #1 is selecting a transmission path via the MPA module 41 #1-1 in FIG. 5 for instance.

The MP 31 #1 transmits a write request to an MPA module 41 in accordance with the selected transmission path (S503). The processing corresponds to the step S202 in FIG. 5. The MP 31 #1 increments a Tx_CNT for an MPA module 41 on the transmission path of the LM 33 #1 (S504). The processing corresponds to the step S203 in FIG. 5.

The MP 31 #1 determines whether or not all write requests of the control information blocks are transmitted (S505), and returns to the step S503 when an untransmitted write request remains (S505:NO).

When all write requests are transmitted (S505:YES), the MP 31 #1 compares an Rx_CNT and a Tx_CNT for an MPA module 41 on the transmission path of the LM#1 and determines whether or not "Rx_CNT≥Tx_CNT" is true (S506). The processing corresponds to the steps S206 and S207 in FIG. 5.

When "Rx_CNT≥Tx_CNT" is "TRUE" (S506:YES), the MP 31 #1 changes the completion flag for the CM 19 #1 to "TRUE" (S507) and ends the processing. The processing corresponds to the step S208 in FIG. 5.

On the other hand, when "Rx_CNT≥Tx_CNT" is "FALSE" (S506:NO), the MP 31 #1 determines, for instance, whether or not a predetermined time period (S511) or longer has elapsed since all write requests are transmitted. When the determination result in the step S511 is "FALSE" (S511:NO), the MP 31 #1 returns to the step S506.

When the determination result in the step S511 is "TRUE" (S511:YES), the MP 31 #1 selects a transmission path different from that in the step S502, returns to the step S503, and re-executes a write request transmission via the selected different transmission path. Because, occurrence of a certain failure is highly probable.

For instance in FIG. 2, in transmitting a write request to the CM 19 #1, when the MP 31 #1 selected a transmission path via the MPA module 41 #1-1 in the step S502 but a predetermined time period or longer has elapsed in the step S511, a transmission path via the MPA module 41 #2-1 is selected in the step 512 and transmission of a write request is started again. The write request transmitted to the MPA module 41 #2-1 reaches the CM control module 43 #1 via the data switch module 42 #2 and the data switch module 42 #1 for instance.

Thus, the storage system is capable of writing control information to a desired CM by using other transmission path even when a certain failure or delay occurs in a PCIe bus or an MPA module 41 on a first transmission path. In other words, reliability and failure resistance of the storage system can be enhanced.

Example 2

Example 2 is explained below. Points of difference from Example 1 are mainly explained, and explanations of points common to Example 1 are either omitted or simplified.

Compared with Example 1, Example 2 differs mainly in a point in which each LM 33 and each MPA module 41 are provided with a plurality of counters as a table (hereinafter referred to as a "counter table"). For instance, a counter table for a write request is provided with a plurality of counters for a write request and a counter table for a completion response is provided with a plurality of counters for a completion response.

Figure 7:
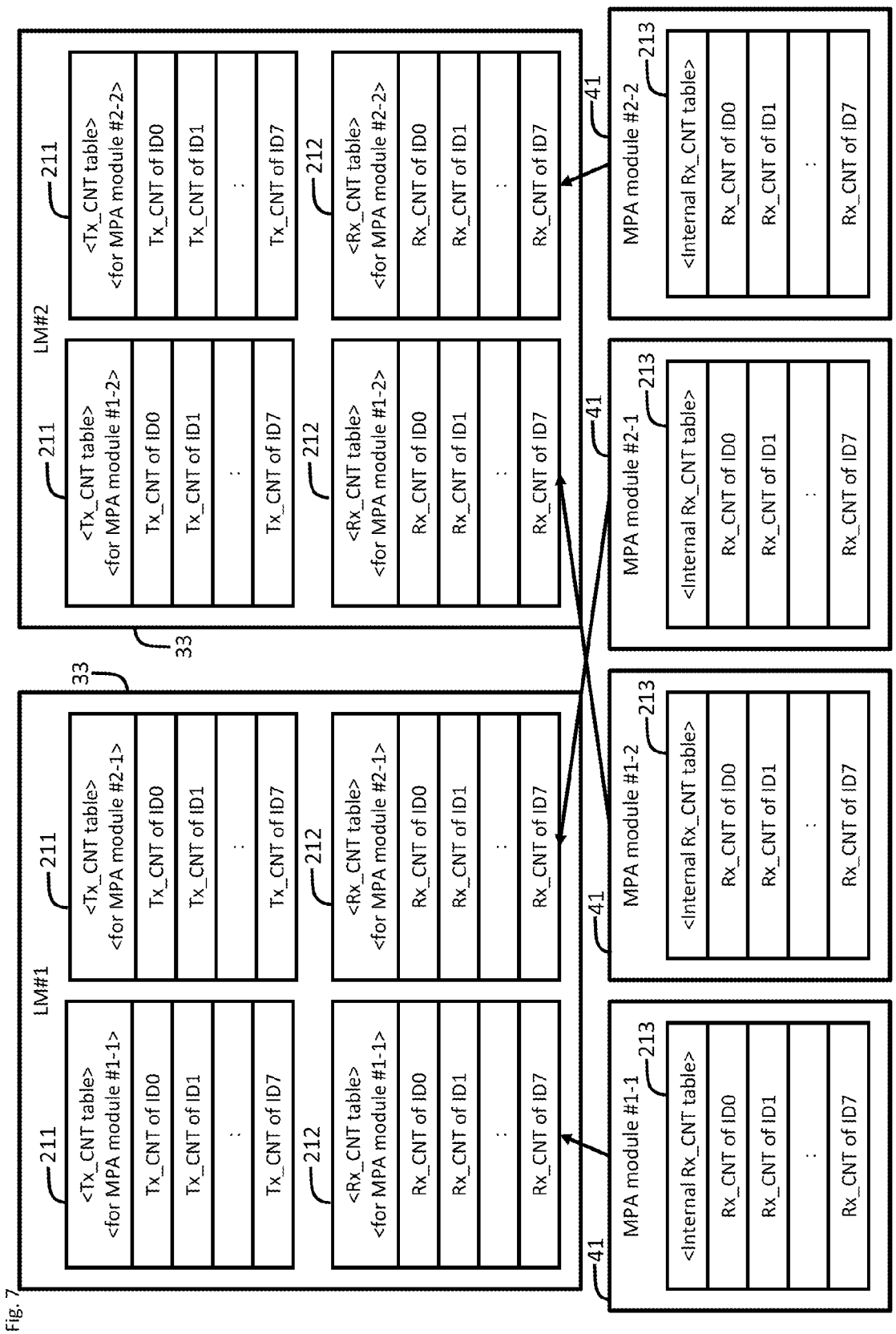
FIG. 7 is a view for explaining counter tables provided in each local memory and a counter table provided in each microprocessor adapter module in accordance with Example 2.

FIG. 7 is a view for explaining counter tables of each LM 33 and each MPA module 41 in accordance with Example 2.

An LM 33 of a processor board 12 is provided with a counter table 211 for a write request and a counter table 212 for a completion response corresponding to each MPA module 41 coupled with the processor board 12 in which the LM 33 is provided. Hereinafter a counter table 211 for a write request may be referred to as a "Tx_CNT table" and a counter table 212 for a completion response may be referred to as an "Rx_CNT table".

For instance, since a processor board 12 #1 shown in FIG. 2 is coupled the with an MPA module 41 #1-1 and an MPA module 41 #2-1, an LM 33 #1 is provided with a Tx_CNT table and an Rx_CNT table for the MPA module 41 #1-1, and a Tx_CNT table and an Rx_CNT table for the MPA module 41 #2-1 as shown in FIG. 7

Similarly, since a processor board 12 #2 shown in FIG. 2 is coupled with an MPA module 41 #1-2 and an MPA module 41 #2-2, an LM 33 #2 is provided with a Tx_CNT table and an Rx_CNT table for the MPA module 41 #1-2, and a Tx_CNT table and an Rx_CNT table for the MPA module 41 #2-2 as shown in FIG. 7.

An MPA module 41 of a cache board 13 is provided with a counter table 213 for a completion response inside. Hereinafter the internal counter table 213 for a completion response may be referred to as an "internal Rx_CNT table". Each Rx_CNT of an internal Rx_CNT table may be assigned to a predetermined register of an MPA module 41. Next, an example of a configuration of a counter table is explained.

Figure 8:
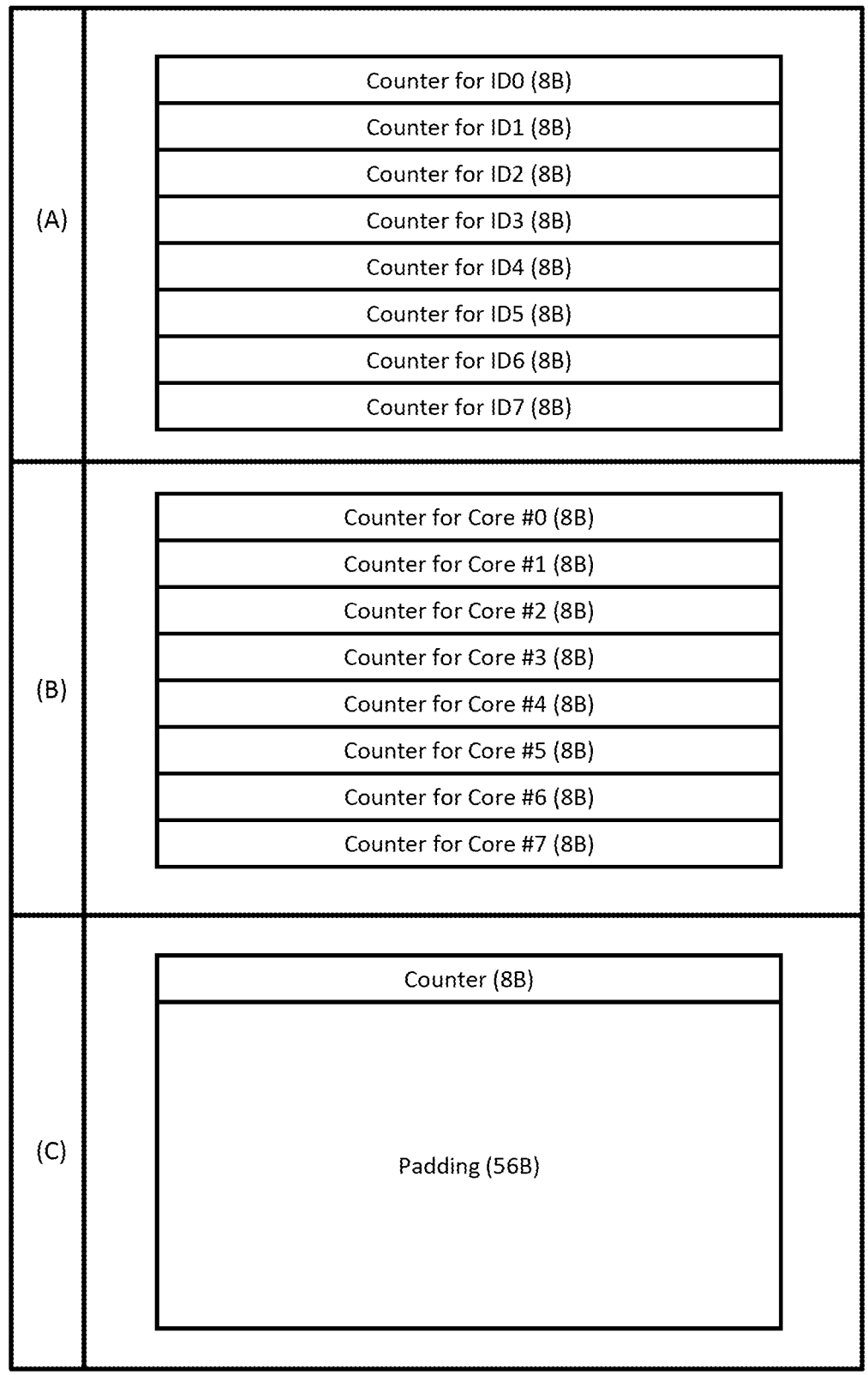
FIG. 8 is a view showing an example of a configuration of counter tables provided in each local memory and each microprocessor adapter module.

FIG. 8 is a view showing an example of a configuration of counter tables of each LM 33 and each MPA module 41.

As shown in FIG. 8(A), each counter (for instance, a Tx_CNT and an Rx_CNT or the like) of a counter table is assigned with ID, and each ID and each job on the MP 31 are associated with each other. When a job of an MP 31 hands over its processing to a job of other MP 31, the job of the original MP 31 that has handed over the processing may use a counter in accordance with an ID associated therewith. Thus, the storage system 1 is capable of handing over a plurality of jobs on an MP 31 to other MP 31 in parallel.

When an MP 31 is a multi-core configuration, each core and a counter may be associated with each other as shown in FIG. 8(B). When a core of an MP 31 hands over its processing to a core of other MP 31, the original core that has handed over the processing may use a counter associated therewith. Thus, processing of a plurality of cores of an MP 31 may be handed over to cores of other MP 31 in parallel. When an MP 31 is provided with a multi-core configuration and a plurality of jobs is executed at each core, each LM 33 and each MPA module 41 may be provided with as many counter tables as the number of cores as shown in FIG. 8(A).

When the LM 33 conforms to a DDR3 standard, a size of a counter table may be 64 bytes. Since data read/write is executed in 64-byte unit in the DDR3 standard, if a counter table is 64 bytes, an MPA module 41 can reflect an internal counter table to an LM 33 at a time. The counter table may be configured as a 64 byte counter table provided with eight 8 byte counters as shown in FIGS. 8(A) and (B) for instance.

A counter table is not necessarily required to assign all 64 bytes to a counter. A counter table may be configured to be provided only with an 8 byte counter for instance. In such a configuration, when an LM33 conforms to the DDR3 standard, an MPA module 41 may compose a 64 byte internal counter table padded with a remaining 56 bytes and reflect it to an LM33 as shown in FIG. 8(C) for instance. In Example 2, it is explained that each LM 33 and each MPA module 41 are provided with a counter table shown in FIG. 8(A).

Figure 9:
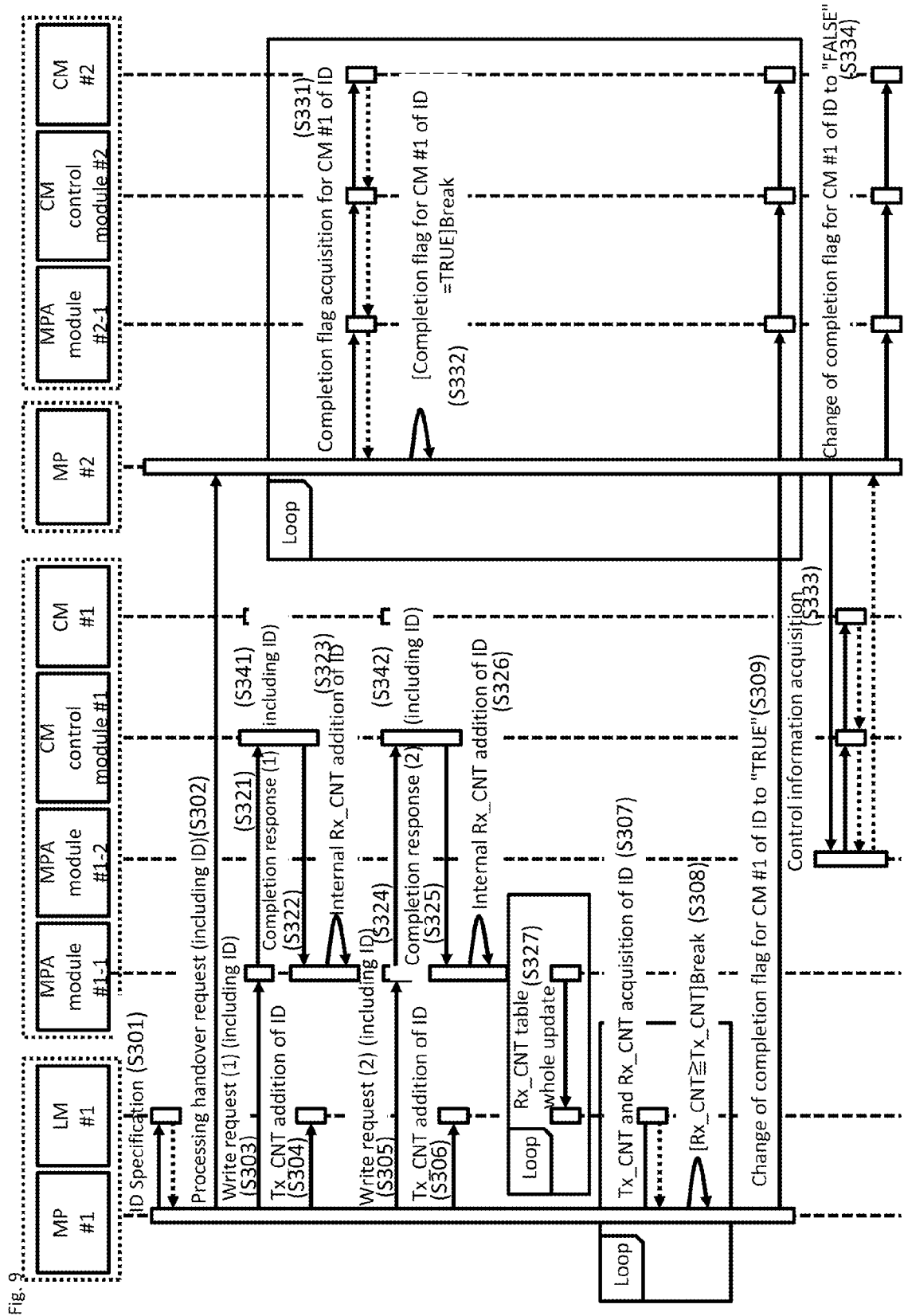
FIG. 9 is a view showing an example of a sequence chart of a storage system when processing of a microprocessor #1 is handed over to a microprocessor #2 in accordance with Example 2.

FIG. 9 is a view showing a sequence chart of the storage system when processing of an MP 31 #1 is handed over to an MP 31 #2 in accordance with Example 2.

<Processing of the MP 31 #1>

A job of the MP 31 #1 at first specifies an unused ID (S301). The job of the MP 31 #1 transmits a processing handover request to the MP 31 #2 which is a handover destination (S302). The job of the MP 31 #1 may include an ID specified in the step S301 (hereinafter referred to as a "specific ID") in the processing handover request.

The job of the MP 31 #1 divides control information into at least two control information blocks and transmits a control information block on a write request packet data to the MPA module 41 #1-1 (S303) for instance. The job of the MP 31 #1 may include a specific ID in a header area or the like of a write request or a packet data.

The job of the MP 31 #1 increments a Tx_CNT corresponding to the specific ID in the Tx_CNT table for the MPA module 41 #1-1 of the LM 33 #1. The job of the MP 31 #1 repeats processing similar to the steps S303 to S304 until transmission of all control information blocks is completed (S305 to S306).

The job of the MP 31 #1 obtains an Rx_CNT and a Tx_CNT corresponding to the specific ID from each of the Rx_CNT table and the Tx_CNT table for the MPA module 41 #1-1 of the LM 33 #1 (S307) and determines whether or not "Rx_CNT≥Tx_CNT" (S308) is true. The MP 31 #1 repeats S307 to S308 until "Rx_CNT≥Tx_CNT" turns true.

When "Rx_CNT≥Tx_CNT" is "TRUE" (S308:YES), the MP 31 #1 leaves the repetitive processing of the steps S307 to S308 and changes a completion flag for the CM 19 #1 in a predetermined area of the CM 19 #2 corresponding to the specific ID to "TRUE" (S309).

<Processing of the MP 31 #2>

The job of the MP 31 #2 obtains a completion flag for the CM 19 #1 from a predetermined area of the CM 19 #2 corresponding to a specific ID included in a processing machine handover request when the transmitted processing handover request transmitted from the job of the MP 31 #1 is received in the step S302 (S331). The job of the MP 31 #2 determines whether or not the completion flag for the CM 19 #1 corresponding to the specific ID is "TRUE" (S332). The job of the MP 31 #2 repeats S331 to S332 until the completion flag for the CM 19 #1 corresponding to the specific ID turns "TRUE". In other words, the job of the MP 31 #2 executes polling to a predetermined area provided with the completion flag for the CM 19 #1 in the CM 19 #2 corresponding to the specific ID.

The job of the MP 31 #2 leaves the repetitive processing of the step S307 to S308 and obtains the control information written by the job of the MP 31 #1 from the CM 19 #1 when the completion flag for the CM 19 #1 corresponding to the specific ID is "TRUE" (S332:YES) (S333). The job of the MP 31 #2 changes the completion flag for the CM 19 #1 in the predetermined area in the CM 19 #2 corresponding to the specific ID to "FALSE" (S334).

<Processing of an Cache Board 13 #1>

The CM control module 43 #1, when received a write request for a control information block from the MP 31 #1 via the MPA module 41 #1-1 (S321), writes a control information block in a predetermined area of the CM 19 #1 (S341) and transmits a write completion response to the MPA module 41 #1-1 (S322). The CM control module 43 #1 may include in a write request an ID included in a write completion response.

The MPA module 41 #1-1, when received the write completion response, increments an internal Rx_CNT corresponding to an ID included in the write completion response in the internal Rx_CNT table (S323). Processing described above is similarly executed for a second and subsequent control information block (S324 to S326, and S342).

The MPA module 41 #1-1 reflects (writes) all Rx_CNTs of an internal Rx_CNT table at a time (collectively) to an Rx_CNT table for the MPA module 41 #1-1 of the LM 33 #1 (S327) for instance.

The step S327 may be repeatedly executed at a predetermined cycle. The step S327 may also be repeatedly executed each time when an internal Rx_CNT is updated the number of times equal to or larger than a predetermined value. The step S327 may also be repeatedly executed each time when write completion responses are received the number of times equal to or larger than a predetermined value for instance.

The storage system in accordance with Example 2 is capable of preventing the MP 31 #2 from obtaining old (before an update) control information from a predetermined area of the CM 19 #1 even when a delay is occurred in a write of a control information block to the CM 19 #1, which is similar to Example 1.

The storage system in accordance with Example 2 is capable of handing over a plurality of jobs on an MP 31 to other MP 31 in parallel because processing described above can be independently executed for each job.

When the LM 33 is configured to conform to the DDR3 standard, the following effects are provided by making the size of the internal Rx_CNT table of the MPA module 41 #1-1 to 64 bytes. In other words, the storage system in accordance with Example 2 is capable of reflecting a plurality of internal Rx_CNTs of the internal Rx_CNT table to the LM 33 at a time at a predetermined cycle (timing) as shown in the step S327. Thus, communication traffic between the processor board 12 and the cache board 13 can be suppressed in comparison with the case where a plurality of the internal Rx_CNTs is individually reflected to the LM 33.

Some examples of the present invention described above are exemplification for explaining the present invention, and are not intended to limit the scope of the present invention only to those examples. A person skilled in the art should be able to implement the present invention in a variety of other modes without deviating from the gist of the present invention.

In a configuration in accordance with Example 2, processing similar to FIG. 6 may be executed. Each step in FIG. 6 may execute processing including a specific ID similar to processing shown in FIG. 9.

The processor board 12 may be provided with a plurality of LM 33s, and an LM 33 provided with a counter for a write request and an LM provided with a counter for a completion response may be different.

REFERENCE SIGNS LIST

12 Processor board
13 Cache board
18 Data transfer control LSI
19 Cache memory (CM)
31 Microprocessor (MP)
33 Local memory (LM)
41 Microprocessor adaptor (MPA) module
43 Cache memory (CM) control module

The invention claimed is:

1. A storage control apparatus comprising:
a first and a second processors;
a first and a second cache memories;
a local memory;
a processor interface module that is an interface to the first processor; and
a cache interface module that is an interface to the first cache memory,
wherein
the local memory has a first table including at least one first counter and a second table including at least one second counter;
the processor interface module has a third table including at least one third counter;
a data size of the third table and the second table is same and equal to a data size of which the local memory can be written at one time;
each of the first, second, and third counters has an ID that shows mutual correspondence relationship;
the first processor is configured to associate a job on the first processor with the ID, and transmit a takeover request of the job including the ID to the second processor, and transmit at least one write request packet including the ID, which is associated with at least one data block element configuring a data block relevant to the takeover of the job respectively, to the processor interface module, and update a value of the first counter to a value corresponding to the number of the transmitted write request packets; and
the processor interface module is configured to transmit the write request packet received from the first processor to the cache interface module; and
the cache interface module is configured to write the data block element, which is associated with the write request packet received from the processor interface module, to the first cache memory, and update a value of the third counter, which is corresponding to the ID included in the write request packet, to a value corresponding to the number of the data block element received from the processor interface module; and
the processor interface module is configured to asynchronously execute updating a value of the third counter and reflecting all value of the third counter included in the third table to all value of the second counter included in the second table at one time writing; and
the first processor is configured to, after transmitting all the write request packet, determine whether or not the second counter corresponding to the ID reaches the first counter corresponding the ID, and when that determination is positive, update the flag corresponding to the ID on the second cache memory to a write completion; and
the second processor is configured to, when the takeover request of the job including the ID is received from the first processor, determine whether or not the flag corresponding to the ID on the second cache memory is a write completion, and when that determination is positive, read the data block relevant to the takeover of job corresponding to the ID, and take over the job corresponding to the ID from the first processor.

2. A method, in a storage control apparatus is configured to:
a first and a second processors;
a first and a second cache memories;
a local memory;
a processor interface module that is an interface to the first processor, and
a cache interface module that is an interface to the first cache memory, and
wherein
the local memory has a first table including at least one first counter and a second table including at least one second counter;
the processor interface module has a third table including at least one third counter;
a data size of the third table and the second table is same and equal to a data size of which the local memory can be written at one time;
each of the first, second, and third counters has an ID that shows mutual correspondence relationship;
the method comprising step of:
the first processor associates a job on the first processor with the ID, and transmits a takeover request of the job including the ID to the second processor, and transmits at least one write request packet including the ID, which is associated with at least one data block element configuring a data block relevant to the takeover of the job respectively, to the processor interface module, and updates a value of the first counter to a value corresponding to the number of the transmitted write request packets; and
the processor interface module transmits the write request packet received from the first processor to the cache interface module; and
the cache interface module writes the data block element, which is associated with the write request packet received from the processor interface module, to the first cache memory, and updates a value of the third counter, which is corresponding to the ID included in the write request packet, to a value corresponding to the number of the data block element received from the processor interface module; and the processor interface module asynchronously executes updating a value of the third counter and reflecting all value of the third counter included in the third table to all value of the second counter included in the second table at one time writing; and the first processor, after transmitting all the write request packet, determines whether or not the second counter corresponding to the ID reaches the first counter corresponding the ID, and when that determination is positive, updates the flag corresponding to the ID on the second cache memory to a write completion; and the second processor, when the takeover request of the job including the ID is received from the first processor, determines whether or not the flag corresponding to the ID on the second cache memory is a write completion, and when that determination is positive, reads the data block relevant to the takeover of job corresponding to the ID, and takes over the job corresponding to the ID from the first processor.

\* \* \* \* \*